(12) United States Patent
Morrissey

(10) Patent No.: US 11,092,272 B2
(45) Date of Patent: Aug. 17, 2021

(54) HOSE CLAMP

(71) Applicant: EMD Millipore Corporation, Burlington, MA (US)

(72) Inventor: Martin Morrissey, Billerica, MA (US)

(73) Assignee: EMD Millipore Corporation, Burlington, MA (US)

(*) Notice: Subject to any disclaimer, the term of this patent is extended or adjusted under 35 U.S.C. 154(b) by 5 days.

(21) Appl. No.: 16/315,045

(22) PCT Filed: May 23, 2017

(86) PCT No.: PCT/US2017/033907
§ 371 (c)(1),
(2) Date: Jan. 3, 2019

(87) PCT Pub. No.: WO2018/026418
PCT Pub. Date: Feb. 8, 2018

(65) Prior Publication Data
US 2020/0182387 A1 Jun. 11, 2020

Related U.S. Application Data

(60) Provisional application No. 62/370,780, filed on Aug. 4, 2016.

(51) Int. Cl.
*F16L 33/22* (2006.01)
*F16L 33/32* (2006.01)

(52) U.S. Cl.
CPC ......... *F16L 33/223* (2013.01); *F16L 33/224* (2013.01); *F16L 33/225* (2013.01)

(58) Field of Classification Search
CPC ..... F16L 33/223; F16L 33/224; F16L 33/225; F16L 33/32
See application file for complete search history.

(56) References Cited

U.S. PATENT DOCUMENTS

| 1,098,294 A | 5/1914 | Patty |
| 2,248,969 A | 7/1941 | Darling |

(Continued)

FOREIGN PATENT DOCUMENTS

| CN | 1867797 A | 11/2006 |
| CN | 101529146 A | 9/2009 |

(Continued)

OTHER PUBLICATIONS

"Extended European Search Report received for European Patent Application No. 17837348.6, dated Mar. 2, 2020", 8 pages.

(Continued)

*Primary Examiner* — Bayan Salone
(74) *Attorney, Agent, or Firm* — EMD Millipore Corporation

(57) ABSTRACT

A clamp device for a barb member having a barbed region for disposing within an end of a flexible tube having an outer surface. The clamp device includes a flexible member including a body having a plurality of finger members compressible between a first resting position and a second clamping position; at least one of the flexible finger members having a radially inwardly extending tooth; the body having a through bore and an outer surface comprising threads; the flexible member being slidable over the barbed region and the outer surface of the flexible tube; a compression member having a body having a through bore and an inner surface including threads; the compression member being slidable over the flexible member; wherein upon threadingly engaging the compression member with the flexible member, the compression member compresses the finger member against the barb member.

5 Claims, 2 Drawing Sheets

(56) References Cited

U.S. PATENT DOCUMENTS

| | | |
|---|---|---|
| 2,991,093 A | 7/1961 | Stephen |
| 3,429,596 A | 2/1969 | Marshall |
| 3,439,944 A | 4/1969 | Leutenegger |
| 3,743,326 A | 7/1973 | Courtot et al. |
| 3,822,074 A | 7/1974 | Welcker |
| 3,843,169 A | 10/1974 | Wise |
| 4,083,586 A | 4/1978 | Helm |
| 4,188,051 A | 2/1980 | Burge |
| 4,253,686 A | 3/1981 | Aitken et al. |
| 4,278,279 A | 7/1981 | Zimmerman |
| 4,302,036 A | 11/1981 | Burge |
| 4,577,894 A | 3/1986 | Wake |
| 4,603,890 A | 8/1986 | Huppee |
| 4,621,842 A | 11/1986 | Kowal et al. |
| 4,877,270 A | 10/1989 | Phillips |
| 5,275,447 A * | 1/1994 | McNab ............... F16L 33/223 285/148.23 |
| 5,284,475 A | 2/1994 | Mackal |
| 5,709,413 A | 1/1998 | Salyers |
| 5,957,509 A | 9/1999 | Komolrochanaporn |
| 6,152,913 A | 11/2000 | Feith et al. |
| 6,334,634 B1 | 1/2002 | Osterkil |
| 6,702,336 B1 | 3/2004 | Chelchowski et al. |
| 6,957,833 B2 | 10/2005 | Guest |
| 7,370,889 B2 | 5/2008 | Maunder et al. |
| 7,475,913 B2 | 1/2009 | Mute Masaaki |
| 7,922,212 B2 | 4/2011 | Werth |
| 7,922,213 B2 | 4/2011 | Werth |
| 8,256,802 B2 | 9/2012 | Werth |
| 8,662,542 B2 | 3/2014 | Werth |
| 2003/0006610 A1 * | 1/2003 | Werth ............... B25B 7/10 285/243 |
| 2005/0271800 A1 | 12/2005 | DeTurris |
| 2007/0198074 A1 | 8/2007 | Dann et al. |
| 2008/0029017 A1 | 2/2008 | DeTurris |
| 2012/0228871 A1 | 9/2012 | Li |
| 2012/0232459 A1 | 9/2012 | Dann et al. |
| 2012/0299296 A1 | 11/2012 | Lombardi, III |
| 2013/0292032 A1 | 11/2013 | DeTurris |
| 2014/0271293 A1 | 9/2014 | Gledhill, III et al. |
| 2015/0101733 A1 | 4/2015 | DeTurris |

FOREIGN PATENT DOCUMENTS

| | | |
|---|---|---|
| EP | 2314904 A1 | 4/2011 |
| JP | 2002054785 A | 2/2002 |
| WO | 2009/155853 A1 | 12/2009 |
| WO | 2018/026418 A1 | 2/2018 |

OTHER PUBLICATIONS

International Search Report and Written Opinion received for PCT Application No. PCT/US2017/033907, dated Aug. 17, 2017, 7 pages.

International Preliminary Report on Patentability received for PCT Application No. PCT/US2017/033907 dated Feb. 14, 2019, 7 pages.

* cited by examiner

HOSE CLAMP

RELATED APPLICATIONS

The present application is a US National Stage application of International Application No. PCT/US2017/033907, filed May 23, 2017, which claims the benefit of priority of U.S. Provisional Application Ser. No. 62/370,780 filed Aug. 4, 2016, the entire content of each of which is incorporated herein by reference in its entirety.

FIELD

The embodiments disclosed herein generally relate to devices that secure tubing in a leak-free manner More specifically, embodiments disclosed herein relate to clamps, particularly clamps for connecting flexible tubing through which fluid flows, such as in high pressure applications. Having leak-free and reliable connections between hose barbs or the like and flexible tubes defining a fluid path such as for fluid transfer is essential when using flexible assemblies, such as in the bioprocess industry.

BACKGROUND

Conventional hose clamps have a series of flexible fingers, which are inserted into a barb/tube assembly, and then pushed into a constraining collar. The collar causes the flexible fingers to compress around the tube, pushing firmly onto the outside diameter of the hose barb. However, in view of the compressive forces involved, the force required to assemble the components is significant, requiring either a manually operated hand tool or a pneumatic device. Once assembled, disassembly is impossible without destruction of the components. This may result in waste and downtime, particularly if the wrong tubes were assembled together and must be undone and reassembled or discarded.

It therefore would be desirable to provide a device that eliminates the drawbacks of the prior art.

SUMMARY

Problems of the prior art have been addressed by embodiments disclosed herein. In certain embodiments, a clamping device is provided for coupling a barb fitting and a flexible tube, and includes a flexible member having one or more flexible fingers, and a compression member that acts as a compression nut and is removably fastened over the flexible member by threading the compression member onto (and off of) the flexible member. The device effectively clamps a barb fitting to a tube in a manner in which the device can be removed and re-used. The barb member, flexible member and compression member are generally tubular in configuration, each having fluid flow passageways.

In certain embodiments, the clamp device is for clamping a barb fitting having a barbed region for disposing within an end of a flexible tube having an internal passageway and an outer surface, and comprises a flexible member comprising a body having a plurality of finger members compressible between a first resting position and a second clamping position, at least one of the flexible finger members having a radially inwardly extending tooth, the body having a through bore and an outer surface comprising threads, the flexible member being slidable over the barbed region of the barb fitting and over the outer surface of the flexible tube; and a compression member having a body having a through bore and an inner surface comprising threads, the compression member being slidable over the outer surface of the flexible tube and being receivable by the flexible member. Upon threadingly engaging the compression member with the flexible member, the compression member compresses the finger member against the barb member and creates a reliable and secure connection, allowing the leak-free flow of fluid through the tube.

In its method aspects, embodiments include securing a barb member having a barbed region within a tube including attaching the barb member to the tube such that the barbed region of the barb member is disposed inside the tube; providing a flexible member comprising a body having a plurality of finger members compressible between a first resting position and a second clamping position, at least one of the flexible finger members having a radially inwardly extending tooth, the body having a through bore and an outer surface comprising threads, providing a compression member having a body having a through bore and an inner surface comprising threads; sliding the flexible member over the outer surface of the flexible tube and over the barbed region of the barb fitting; sliding the compression member over the outer surface of the flexible tube towards the flexible member; and threadingly engaging the compression member and the flexible member to compresses the finger member against the barb member. The barb member can be unsecured from the tube in a non-destructive manner by threadingly disengaging the compression member from the flexible member. The flexible member and compression member then can be reused.

DETAILED DESCRIPTION

Figure 1:
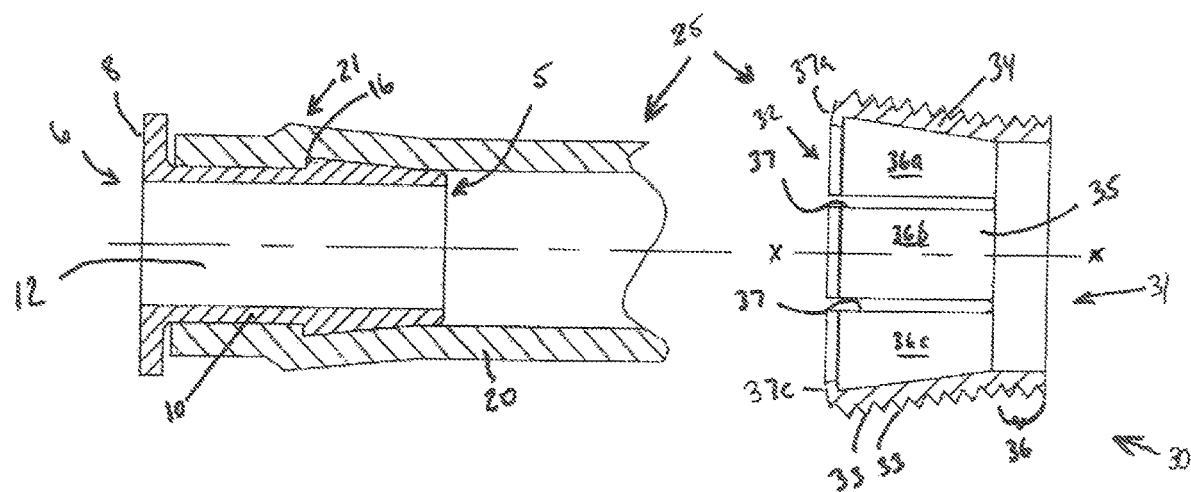
FIG. 1 is an exploded view, in cross-section, of a clamp device in accordance with certain embodiments.

A more complete understanding of the components, processes and apparatuses disclosed herein can be obtained by reference to the accompanying drawings. The figures are merely schematic representations based on convenience and the ease of demonstrating the present disclosure, and is, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawing, and are not intended to define or limit the scope of the disclosure. In the drawing and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

As used herein, the phrase "consisting essentially of" limits the scope of a claim to the specified materials or steps and those that do not materially affect the basic and novel characteristics of the claimed subject matter. The term permits the inclusion of substances which do not materially affect the basic and novel characteristics of the embodiment, feature, or component under consideration. Accordingly, the expressions "consists essentially of" or "consisting essentially of" mean that the recited embodiment, feature, component, etc. must be present and that other embodiments, features, components, etc., may be present provided the presence thereof does not materially affect the performance, character or effect of the recited embodiment, feature, component, etc. Additional method steps that add significant time to the process would be considered to materially affect the basic and novel characteristics of the claimed subject matter.

Turning now to FIG. 1, a barb fitting 10 is shown. The configuration of the barb fitting 10 is not particularly limited; it generally includes a first end 5 that is "barbed" or expanded and configured to be inserted into a tube 20, and a second end 6 spaced from the first end 5 that includes an annular flange 8 that provides a stop against further penetration of the barb fitting 10 into the tube 20. The barbed end 5 has a truncated conical shape with a barb region 16 having an outer diameter larger than the internal diameter of a flexible tube 20, so that when the barb fitting 10 is inserted into the flexible tube 20, it causes the wall of the tube to flex or distort outwardly in a similar shape, as seen at 21 in FIG. 1. This serves to help secure and position the barb fitting 10 in the tube 20. The barb fitting 10 has an internal through bore 12 that defines a fluid passageway for fluid flow. The internal through bore 12 may be of constant inner diameter. The barb fitting 10 can be made of stainless steel, but is preferably made of a non-metal material such as plastic, e.g., polypropylene, or silicone. For medical applications, it may be made of an FDA compliant material.

Figure 2:
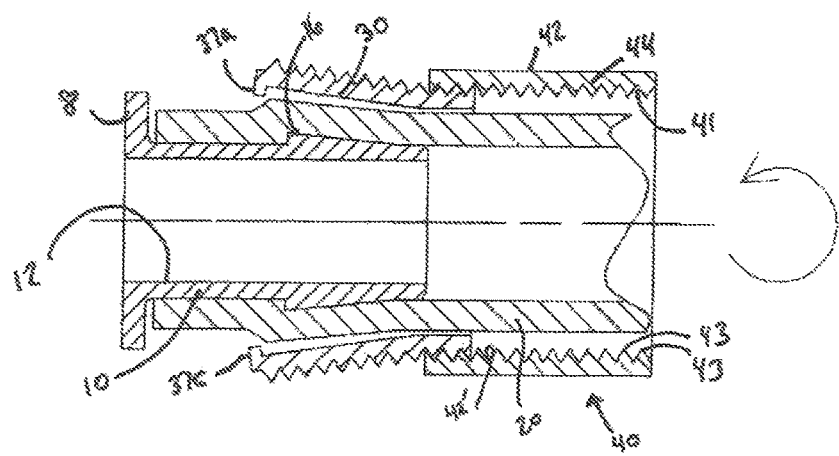
FIG. 2 is a cross-sectional view of a clamp device in accordance with certain embodiments, shown partially assembled with a tube.

In certain embodiments, the clamp device may be made of a gamma-stable, injection molded thermoplastic, such as Nylon (Polyamide), a high density polyethylene (HDPE), or a gamma-stabilized polypropylene co-polymer. In certain embodiments, the clamp device 25 includes a flexible member 30, and a compression member 40 (FIG. 2). In certain embodiments, the flexible member 30 has a body 34 and an internal generally cylindrical bore 35 extending through the body 34. In certain embodiments, the body 34 is shaped as a truncated cone, having a first end 31 and a spaced second end 32, the second end 32 having an internal diameter larger than the internal diameter of the first end 31. In certain embodiments, the body 34 includes a region 36 extending from the first end 31 that has a constant inner diameter equal to the inner diameter at the first end 31. The remainder of the body 34 of flexible member 30 then tapers outwardly until it reaches it maximum inner diameter just short of the second end 32. In certain embodiments, at least a portion of the outer wall of the flexible member 30 is threaded with threads 33, Although the threads 33 are shown as extending throughout the entire length of the flexible member 30, in some embodiments the outer wall may be only partially threaded. In some embodiments where the outer wall is only partially threaded, the portion of the outer wall that is not threaded may have a smooth contour and be devoid of ramps or ledges. Thus, in certain embodiments the threads 33 may be limited to the region of the flexible member defined by the flexible fingers 36a-36f (discussed below). In other embodiments the region 36 of the flexible member 30 may be partially threaded, with the threads 33 optionally also extending onto the flexible fingers 36a-36f. In some embodiments the interior surface of the flexible member 30 is smooth, being devoid of shelves, ramps or ledges.

Figure 3:
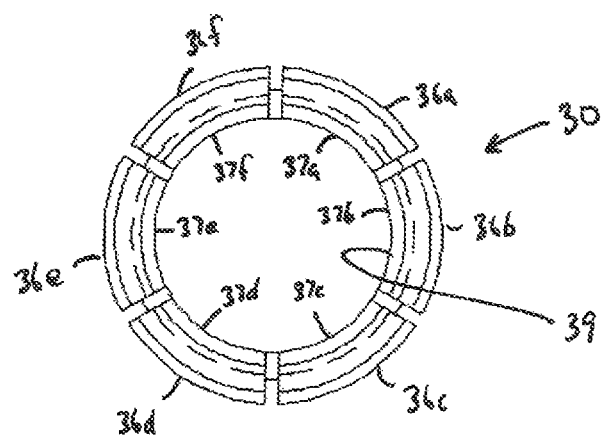
FIG. 3 is a top view of a flexible member in accordance with certain embodiments.

In certain embodiments there are a plurality of spaced slits 37 through the wall of the body 34 extending from the internal bore radially outwardly, and extending from the second end 32 axially until region 36. Preferably the slits 37 are equally spaced. In the embodiment shown, there are six spaced slits 37, although those skilled in the art will appreciate that fewer or more slits could be present. The slits 37 define between them resilient flexible finger members 36a-36f (FIG. 3) that are capable of being compressed from their normal or resting position where their ends may be slightly flared radially outwardly, to a compressed position where the ends of the finger members 36a-36f are no longer radially flared, or are radially flared to a lesser extent than when in their normal or resting position. Accordingly, in the compressed position, the diameter of the internal bore 39 in the region defined between the finger members 36a-36f is smaller than when in the resting or normal position. Upon release of the compressive force, the fingers return to their normal or resting position. Due to the slits 37, the second end 32 forms a discontinuous annular ring.

Figure 4:
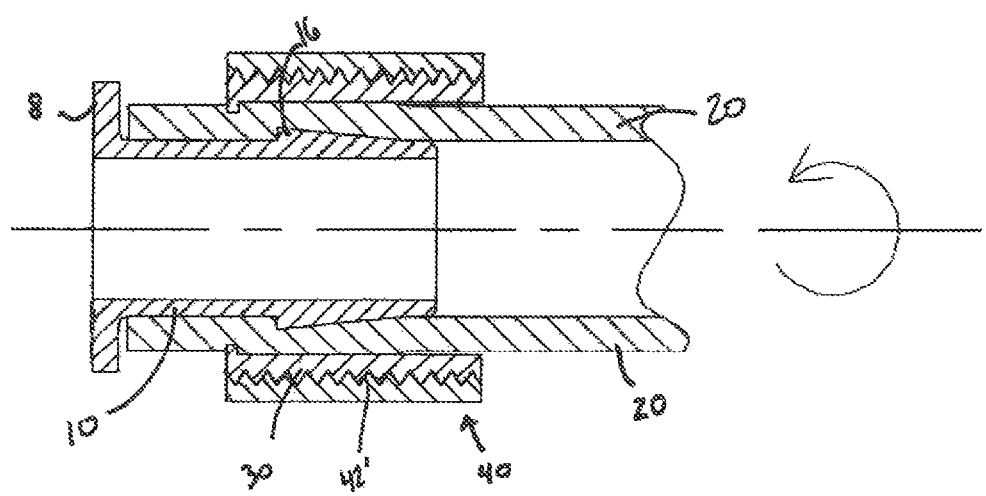
FIG. 4 is a cross-sectional view of a clamp device in accordance with certain embodiments, shown in an assembled condition with a tube.

In some embodiments, at least one of the finger members 36a-36f terminates in a radially inwardly projecting tooth 37a-37f. The radially inwardly projecting tooth 37a-37f is configured and positioned such that when the clamp device 25 is in the assembled state with a tube 20 such as is shown in FIG. 4, the one or more teeth 37a-37f sit behind and compress the flexed or distorted region 21 and provide an axial stop against the underside of the barb, preventing the barb from being removed from the tube 20. In certain embodiments, each of the flexible finger members 36a-36f includes a respective radially inwardly projecting tooth 37a-37f. In some embodiments, the radially inwardly projecting tooth 37a-37f is normal to the longitudinal axis x-x of the flexible member 30.

Due to the truncated conical shape of the flexible member 30, and the presence of the slits 37 in the flexible member 30, the flexible member 30 is capable of sliding over the region of the outer surface of tube 20 that expands in outer diameter as a result of the presence of the barb fitting 10. When the flexible member 30 is so positioned, this causes the flexible finger members 36a-36f to flare radially outwardly.

In certain embodiments, compression member 40 is a resilient member having a body 44 and an internal cylindrical through bore 41 extending through the body 44. The through bore 41 is of sufficient diameter to allow the compression member 40 to slide over the outer surface of the tube 20, and to slide over at least a portion of the flexible member 30, At least a portion of the inner wall 42' of the compression member 40 may include threads 43 that are configured to interact with threads 33 of the flexible member 30. In some embodiments the portion of the inner wall 42' that is not threaded is smooth and includes no ramps, ledges, slots, grooves or projections. In certain embodiments, the outer wall 42 of the compression member may be faceted, and is square or hexagonally shaped. Alternatively, the compression member 40 can be generally cylindrical in shape, and may have a knurled outer surface. The knurled or faceted surface facilitates grasping of the compression member by hand or with a suitable tool such as a wrench. Other outer configurations may be suitable and are within the scope of the embodiments disclosed herein.

In some embodiments, the clamp device for clamping a barb member having a barbed region for disposing within an end of a tube having an outer surface, consists essentially of a flexible member comprising a body having a plurality of finger members compressible between a first resting position and a second clamping position, at least one of said flexible finger members having a radially inwardly extending tooth, said body having a through bore and an outer surface comprising threads, said flexible member being slidable over said barbed region of said barb fitting and over said outer surface of said tube; a compression member having a body, said body having a through bore and an inner surface comprising threads, said compression member being slidable over said outer surface of said tube and over at least a portion of said flexible member; wherein upon threadingly engaging said compression member with said flexible member, the compression member compresses the finger member against the barb member. Such a clamp device does not have features other than the threads to secure or lock the compression member on the flexible member.

In operation, the barb fitting 10 may be inserted into the bore of a flexible tube 20, leading with the barbed end 5, until the flange portion 8 abuts against the end of the tube 20 as shown in FIG. 1. The end of the barb fitting 10 having flange 8 may be attached to a device. The flexible member 30 is slid onto the outer surface of tube 20 axially, second end 32 first, so that the expanded finger members 36a-36f slide up and over the region 21 of the tube 20 that is expanded by the barb. The compression member 40 is then slid onto the outer surface of tube 20 axially towards the first end 31 of the flexible member 30. Relative rotation between the flexible member 30 and the compression member 40 causes the compression members 40 to become threadingly engaged with the flexible member 30, as shown in FIG. 2. If desired, the flexible member 30 and/or the compression member 40 can be placed onto the tube 20 prior to inserting the barb fitting 10. As the compression member 40 is threaded further onto the flexible member 30, it causes the finger members 36a-36f to compress radially inwardly against the tube 20, thereby compressing the tube 20 into intimate contact with the barb fitting 10, creating a clamping force between the barb fitting 10 and the flexible member 30 (FIG. 4). The clamping force creates a 360° seal around the barb fitting 10. The seal is liquid-tight. In one embodiment, the seal is an aseptic seal or a sterile seal. The one or more teeth 37a-37f at the terminal ends of the finger members 36a-36f seat behind the barb as seen in FIG. 4. This creates additional clamping force on the tube 20, as well as produces an axial stop against the underside of the barb, preventing the barb from being pulled out of the tube 20 and thereby creating a reliable and secure connection. Actuation of the compression member 40 does not require significant force due to the mechanical advantage of the screw, and can be carried out manually. The device can be easily disassembled by unscrewing the compression member 40 from the flexible member 30, and may be optionally re-used. As a result, the components need not be destroyed to disassemble the device, and no mechanical locking of the compression member 40 to the flexible member 30 is necessary; the compression member 40 remains engaged with the flexible member 30 by friction. No special tools are necessary to assemble or disassemble the device.

While various aspects and embodiments have been disclosed herein, other aspects, embodiments, modifications and alterations will be apparent to those skilled in the art upon reading and understanding the preceding detailed description. The various aspects and embodiments disclosed herein are for purposes of illustration and are not intended to be limiting. It is intended that the present disclosure be construed as including all such aspects, embodiments, modifications and alterations insofar as they come within the scope of the appended claims or the equivalents thereof

What is claimed is:

1. A clamp device for clamping a barb fitting having a barbed region for disposing within an end of a tube having an outer surface, said device comprising:
   a flexible member comprising a body having a plurality of spaced slits, defining therebetween a plurality of flexible finger members compressible between a first resting position and a second clamping position, at least one of said plurality of flexible finger members having a radially inwardly extending tooth, said body having a through bore and an outer surface comprising threads, said flexible member being slidable over said barbed region of said barb fitting and over said outer surface of said tube; and
   a compression member having a body, said body having a through bore and an inner surface comprising threads, said compression member being slidable over said outer surface of said tube and over at least a portion of said flexible member; wherein the compression member is capable of being threadingly disengaged from the flexible member in a nondestructive manner, wherein no special tools are necessary to assemble or disassemble the clamp device and upon threadingly engaging by friction said compression member with said flexible member, the compression member is capable of compressing the plurality of flexible finger members into a discontinuous annular ring against the barb fitting, creating a seal.

2. The clamp device of claim 1, wherein the threads on said flexible member extend to said at least one finger member.

3. The clamp device of claim 1, wherein each of said plurality of finger members has a radially inwardly extending tooth.

4. The clamp device of claim 1, wherein said threads on said body of said flexible member extend to said finger members.

5. A method of securing a barb fitting having a barbed region within a tube, said method comprising:
   attaching said barb fitting to said tube such that said barbed region is inside said tube; providing a flexible member comprising a body having a plurality of finger members compressible between a first resting position and a second clamping position, at least one of said flexible finger members having a radially inwardly extending tooth, said body having a through bore and an outer surface comprising threads,
   providing a compression member having a body, said body having a through bore and an inner surface comprising threads;
   sliding said flexible member over said outer surface of said flexible tube and over said barbed region of said barb fitting;
   sliding said compression member over said outer surface of said flexible tube towards said flexible member; and
   threadingly engaging said compression member upon threadingly engaging by friction, wherein the compression member is capable of being threadingly disengaged from the flexible member in a nondestructive manner, wherein no special tools are necessary to assemble or disassemble the clamp device and said flexible member compresses said finger member against said barb fitting, creating a seal.

\* \* \* \* \*